United States Patent
Tardo et al.

(10) Patent No.: US 7,376,826 B2
(45) Date of Patent: May 20, 2008

(54) METHODS AND APPARATUS FOR PERFORMING ENCRYPTION AND AUTHENTICATION

(75) Inventors: Joseph Tardo, Palo Alto, CA (US); Donald P. Matthews, Morgan Hill, CA (US)

(73) Assignee: Broadcom Corporation, Irvine, CA (US)

( * ) Notice: Subject to any disclaimer, the term of this patent is extended or adjusted under 35 U.S.C. 154(b) by 659 days.

(21) Appl. No.: 10/160,322

(22) Filed: May 31, 2002

(65) Prior Publication Data

US 2003/0223585 A1   Dec. 4, 2003

(51) Int. Cl.
*H04L 9/00* (2006.01)
*H04L 9/32* (2006.01)
*H04N 7/167* (2006.01)

(52) U.S. Cl. .................. 713/151; 713/192; 380/42; 380/225; 380/277

(58) Field of Classification Search ............... 713/192, 713/200, 151; 380/277, 42, 29
See application file for complete search history.

(56) References Cited

U.S. PATENT DOCUMENTS

| | | | | |
|---|---|---|---|---|
| 5,598,410 | A * | 1/1997 | Stone | 370/469 |
| 5,796,836 | A | 8/1998 | Markham | |
| 6,182,216 | B1 * | 1/2001 | Luyster | 713/168 |
| 6,226,742 | B1 * | 5/2001 | Jakubowski et al. | 713/170 |
| 6,333,983 | B1 * | 12/2001 | Enichen et al. | 380/273 |
| 6,378,072 | B1 * | 4/2002 | Collins et al. | 713/187 |
| 6,477,646 | B1 * | 11/2002 | Krishna et al. | 713/189 |
| 6,484,257 | B1 * | 11/2002 | Ellis | 713/153 |
| 6,549,622 | B1 * | 4/2003 | Matthews, Jr. | 380/29 |
| 6,983,366 | B1 * | 1/2006 | Huynh et al. | 713/168 |
| 7,000,120 | B1 * | 2/2006 | Koodli et al. | 713/1 |
| 7,007,163 | B2 * | 2/2006 | Tardo et al. | 713/164 |
| 7,174,452 | B2 * | 2/2007 | Carr | 713/151 |
| 2002/0078342 | A1 * | 6/2002 | Matthews, Jr. | 713/151 |
| 2002/0124177 | A1 * | 9/2002 | Harper et al. | 713/189 |

OTHER PUBLICATIONS

Guendouz, H.; Bouaziz, S.; Circuits and Systems, 1998. ISCAS '98. Proceedings of the 1998 IEEE International Symposium on vol. 6, May 31-Jun. 3, 1998 pp. 434-437 vol. 6 ☐☐.*

Korkishko, T.; Melnyk, A.; AFRICON, 1999 IEEE vol. 1, Sep. 27-Oct. 1, 1999 pp. 175-180 vol. 1 ☐☐.*

Mitsuyama, Y.; Andales, Z.; Onoye, T.; Shirakawa, I.; Circuits and Systems, 2001. ISCAS 2001. The 2001 IEEE International Symposium on vol. 4, May 6-9, 2001 pp. 734-737 vol. 4 ☐☐.*

"Secure Products VMS115", VLSI Technology, Inc., Printed in USA, Document Control: VMS115, VI, 0, Jan. 1999, pp. 1-2.

"VMS115 Data Sheet", VLSI Technology, Inc., a subsidiary of Philips Semiconductors, Revision 2:3, Aug. 10, 1999, pp. 1-64.

(Continued)

*Primary Examiner*—Ayaz Sheikh
*Assistant Examiner*—Kaveh Abrishamkar
(74) *Attorney, Agent, or Firm*—Sterne Kessler Goldstein & Fox, p.l.l.c.

(57) ABSTRACT

Methods and apparatus are provided for a cryptography accelerator to efficiently perform authentication and encryption operations. A data sequence is received at a cryptography accelerator. An encrypted authentication code and an encrypted data sequence is provided efficiently upon performing single pass authentication and encryption operations on the data sequence.

26 Claims, 8 Drawing Sheets

OTHER PUBLICATIONS

Senie, D., "NAT Friendly Application Design Guidelines", Amaranth Networks, Inc., NAT Working Group, Internet-Draft, Sep. 1999, pp. 1-7.

Floyd, Sally, et al., "Random Early Detection Gateways for Congestion Avoidance", Lawrence Berkeley Laboratory, University of California, IEEE/ACM Transactions on Networking, Aug. 1993, pp. 1-32.

Egevang, K., et al., "The IP Network Address Translator (NAT)", Network Working Group, May 1994, pp. 1-10.

Pall, G. S., et al., "Microsoft Point-To-Point Encryption (MPPE) Protocol", Microsoft Corporation, Network Working Group, Internet Draft, Oct. 1999, pp. 1-12.

Deutsch, P., "Deflate Compressed Data Format Specification Version 1.3", Aladdin Enterprises, Network Working Group, May 1996, pp. 1-17.

Kent, S., "IP Authentication Header", Network Working Group, Nov. 1998, pp. 1-22.

Kent, S., et al., "IP Encapsulating Security Payload (ESP)", Network Working Group, Nov. 1998, pp. 1-22.

Maughan, D, et al., "Internet Security Association and Key Management Protocol (ISAKMP)", Network Working Group, Nov. 1998, pp. 1-20.

Harkins, D., et al., "The Internet Key Exchange (IKE)", Cisco Systems, Network Working Group, Nov. 1998, pp. 1-12.

Srisuresh, P., "Security Model with Tunnel-mode Ipsec for NAT Domains", Lucent Technologies, Network Working Group, Oct. 1999, pp. 1-11.

Shenker, S., "Specification of Guaranteed Quality of Service", Network Working Group, Sep. 1997, pp. 1-20.

Srisuresh, P., et al., "IP Network Address Translator (NAT) Terminology and Considerations", Lucent Technologies, Network Working Group, Aug. 1999, pp. 1-30.

Kent, S., et al., "Security Architecture for the Internet Protocol", Network Working Group, Nov. 1998, pp. 1-66.

"Compression for Broadband Data Communications", BlueSteel Networks, Inc., Sep. 8, 1999, pp. 1-9.

"Securing Broadband Communications" BlueSteel Networks, Inc., Sep. 8, 1999, pp. 1-10.

Analog Devices: "ADSP2141 SafeNetDPS User's Manual, Revision 6", Analog Devices Technical Specifications, Mar. 2000, XP002163401, 87 Pages.

C. Madson, R. Glenn: "RFC 2403- The Use of HMAC-MD5-96 within ESP and AH", IETF Request for Comments, Nov. 1998, XP002163402, Retrieved from Internet on Mar. 20, 2001, http://www.faqs.org/rfcs/frc2403.html, 87 Pages.

S. Kent, R. Atkinson: "RFC 2406-IP Encapsulating Security Payload (ESP)" IETF Request for Comments, Nov. 1998, XP002163400, Retrieved from the Internet on Mar. 20, 2001, http://www.faqs.org/rfcs/frc2406.html, 5 Pages.

Keromytis, et al., "Implementing IPsec", Global Telecommunications Conference (Globecom), IEEE, Nov. 3, 1997, pp. 1948-1952.

Pierson, et al., "Context-Agile Encryption for High Speed Communication Networks", Computer Communications Review, Association for Computing Machinery, vol. 29, No. 1, Jan. 1999, pp. 35-49.

Sholander, et al., "The Effect of Algorithm-Agile Encryption on ATM Quality of Service", Global Telecommunications Conference (Globecom), IEEE, Nov. 3, 1997, pp. 470-474.

Smirni, et al., "Evaluation of Multiprocessor Allocation Policies", Technical Report, Vanderbilt University, Online, 1993, pp. 1-21.

Tarman, et al., "Algorithm-Agile Encryption in ATM Networks", IEEE Computer, Sep. 1998, vol. 31, No. 1, pp. 57-64.

Wassal, et al., "A VLSI Architecture for ATM Algorithm-Agile Encryption", Proceedings Ninth Great Lakes Symposium on VLSI, Mar. 4-6, 1999, pp. 325-328.

Analog Devices: "Analog Devices and IRE Announce First DSP-Based Internet Security System-On-A-Chip", Analog Devices Press Release, Online, Jan. 19, 1999, pp. 1-3. http://content.analog.com/pressrelease/prdisplay/0,1622,16,00.html.

3Com: "3Com Launces New Era of Network Connectivity", 3Com Press Release, Jun. 14, 1999, pp. 1-3.

Bruce Scheier, John Wiley & Sons "*Applied Cryptograpy*", Chapter 8, "*Key Management*", pp. 169-188, Copyright © 1996 by Bruce Schneier ISBN 0-471-12845-7, ISBN 0-471-11709-9.

Federal Information Processing Standards Publication 197, Nov. 26, 2001, "*Specification For The Advanced Encryption Standards (AES)*", pp. ii-iv and pp. 1-47.

Dierks et al, "*The TLS Protocol Version 1.0*" Network Working Group Request for Comments: 2246, Copyright ©, The internet Society (1999) All rights reserved, pp. 1-69.

Tardo et al. Improving Data Transfer Efficiency In A Cryptography Accelerator System, U.S. Appl. No. 10/161,475, filed May 31, 2002.

\* cited by examiner

METHODS AND APPARATUS FOR PERFORMING ENCRYPTION AND AUTHENTICATION

BACKGROUND OF THE INVENTION

1. Field of the Invention

The present application relates to encryption and authentication operations. More specifically, the present application relates to methods and apparatus for performing encryption and authentication operations for stream ciphers and variations of stream ciphers.

2. Description of Related Art

Conventional software and hardware designs for performing encryption and authentication operations for stream ciphers and variations of stream ciphers are inefficient. One design for performing encryption and authentication entails encrypting a data sequence and subsequently calculating an authentication code based on the encrypted data sequence. Calculating the authentication value typically involves performing hash operations on the encrypted data sequence. Other protocols specify calculating an authentication code based on the data sequence and encrypting the data sequence. Still other algorithms involve calculating an authentication code based on the data sequence and encrypting both the authentication code and the data sequence.

However, typical software and hardware designs for calculating an authentication code based on the data sequence and encrypting both the authentication code and the data sequence are inefficient and resource intensive.

A variety of techniques for performing encryption and authentication operations are described in Applied Cryptography, Bruce Schneier, John Wiley & Sons, Inc. (ISBN 0471128457), NIST Federal Information Processing Standard FIPS-197 (AES), and NIST Special Publication 800-38a (Modes of Operation), the entireties of which are incorporated by reference for all purposes.

It is therefore desirable to provide methods and apparatus for improving cryptographic operations with respect to some or all of the performance limitations noted above.

SUMMARY OF THE INVENTION

Methods and apparatus are provided for a cryptography accelerator to efficiently perform authentication and encryption operations. A data sequence is received at a cryptography accelerator. An encrypted authentication code and an encrypted data sequence are provided efficiently upon performing read operations on the data sequence once.

According to various embodiments, a method of performing cryptography operations is provided. A data sequence is received at a cryptography accelerator. A keystream associated with the data sequence is identified. Encryption and authentication operations are performed using the data sequence and the keystream to derive an encrypted authentication code and an encrypted data sequence. The encrypted authentication code and the encrypted data sequence are derived upon performing a single pass read. The encrypted authentication code and the encrypted data sequence are provided.

In another embodiment, a cryptography accelerator is provided. The cryptography accelerator includes an interface, a keystream generator, and cryptography circuitry. The interface is configured to receive a data sequence. The keystream generator is operable to provide a keystream associated with the data sequence. The cryptography circuitry is configured to perform encryption and authentication operations using the data sequence and the keystream to derive the encrypted authentication code and the encrypted data sequence. The encrypted authentication code and the encrypted data sequence are derived upon performing a single pass read.

In still another embodiment, a method for authenticating and encrypting a data sequence is provided. A data sequence is received at a cryptography accelerator from a host. An unprocessed authentication value associated with the data sequence is provided. The data sequence and the unprocessed authentication value are encrypted by being combined with a keystream while simultaneously calculating an actual authentication code associated with the data sequence. Combining the unprocessed authentication value and the data sequence with the keystream provides a processed authentication value and an encrypted data sequence. The processed authentication value is combined with the calculated authentication code to derive the encrypted authentication code. The encrypted authentication code and the encrypted data sequence are then provided.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

The present application relates to implementing a cryptography accelerator. More specifically, the present application relates to methods and apparatus for providing a cryptography accelerator capable of performing secure session operations.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of SSL or TLS using the AES, and RC4 encryption algorithms and the SHA-1 and MD5 authentication algorithms. However, it should be noted that the techniques of the present invention can be applied to a variety of different authentication and cryptography operations for cryptography processing in general. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
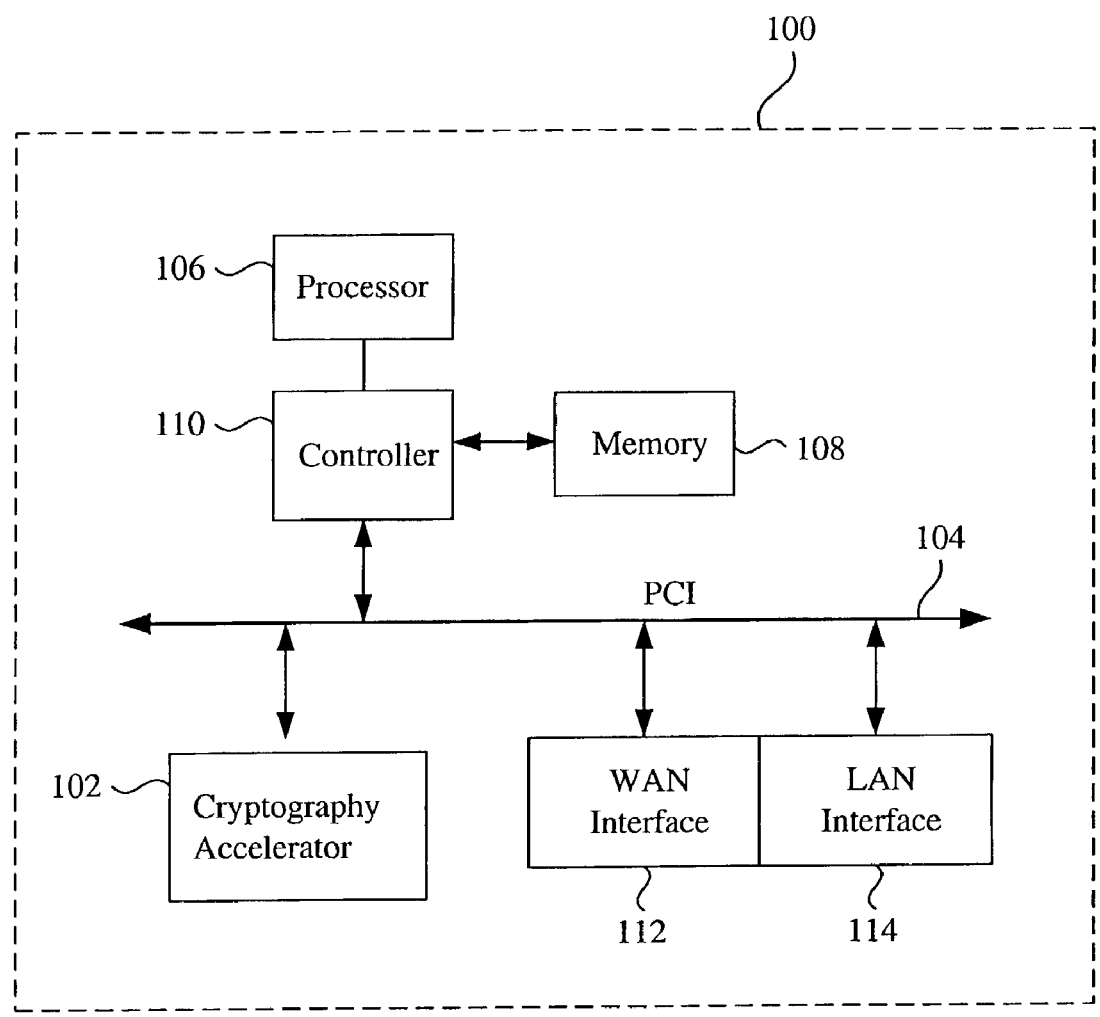
FIG. 1 is a diagrammatic representation of a system that can use the techniques of the present invention.

FIG. 1 is a diagrammatic representation of one example of a processing system 100 in accordance with an embodiment of the present invention. As shown in FIG. 1, the present invention may be implemented in a stand-alone cryptography accelerator 102 or as part of the system 100. Any logic, mechanism, or device operable to perform encryption, decryption, and/or authentication operations is referred to herein as a cryptography accelerator. In the described embodiment, the cryptography accelerator 102 is connected to a bus 104 such as a PCI bus via a standard on-chip PCI interface. The processing system 100 includes a processing unit 106 and a system memory unit 108. The processing unit 106 and the system memory unit 108 are coupled to the system bus 104 via a bridge and memory controller 110.

Although the processing unit 106 may be the central processing unit (CPU) of a system 100, it does not necessarily have to be the CPU. It can be one of a variety of processors in a multiprocessor system. In one example, a LAN interface 114 is provided to couple the processing system 100 to a local area network (LAN) to allow packet receipt and transmission. Similarly, a Wide Area Network (WAN) interface 112 can also be provided to connect the processing system to a WAN (not shown) such as the Internet. The WAN interface manages in-bound and out-bound packets to allow automatic decryption and authentication processing.

According to various embodiments, the cryptography accelerator 102 is an application specific integrated circuit (ASIC) coupled to the processor 106. The cryptography accelerator 102 can also be a programmable logic device (PLD), field programmable gate array (FPGA), or other device coupled to the processor 106. According to specific embodiments, the cryptography accelerator 102 is implemented either on a card connected to the bus 104 or as a standalone chip integrated in the system 100.

In other embodiments, the cryptography accelerator 102 itself is integrated into the processing core of a CPU of system 100, such as that available from Tensilica Corporation of Santa Clara, Calif. or MIPS Technologies of Mountain View, Calif. In another embodiment, techniques and mechanisms of the present invention are integrated into a CPU such as a CPU available from Intel Corporation of San Jose, Calif. or AMD Corporation of Sunnyvale, Calif. By implementing cryptography accelerator functionality entirely on the processor 106, a separate card or chip in the system 100 is not needed. In still other embodiments, the processing system 100 including the cryptography accelerator 102 is implemented as a system on a chip (SOC). The network interfaces, memory, processing core, and cryptography accelerator functionality are provided on a single integrated circuit device.

The cryptography accelerator 102 is capable of implementing various network security standards, such as SSL and TLS, which provide application-transparent encryption and authentication services for network traffic. Note that, throughout, all references to SSL also apply to TLS.

Network security standards such as SSL provide authentication through the use of hash algorithms and encryption through the use of encryption algorithms. Two commonly used hash algorithms are MD5 and the Secure Hash algorithm (SHA-1). Other hash algorithms such as MD4 and MD2 are also available. One commonly used encryption algorithm is RC4. Other encryption algorithms such as AES are also available. Authentication and encryption algorithms are described in Applied Cryptography, Bruce Schneier, John Wiley & Sons, Inc. (ISBN 0471128457), NIST Federal Information Processing Standard FIPS-197 (AES), and Internet Engineering Task Force (IETF) Request for Comments Standard RFC2246 (TLS), the entireties of which are incorporated by reference for all purposes. Even though many network security standards apply the same hash algorithms, different approaches are taken toward applying the hash algorithms to the actual authentication computation.

Figure 2:
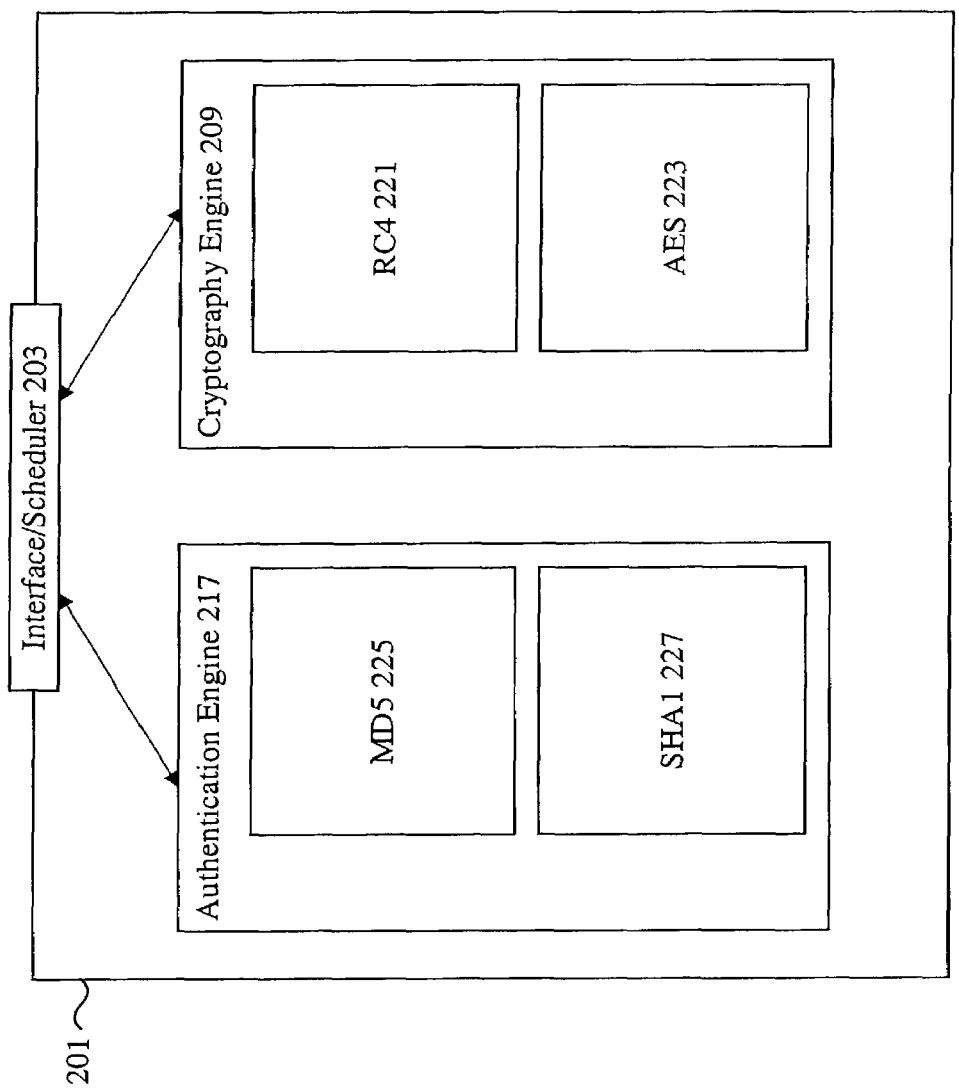
FIG. 2 is a diagrammatic representation of an integrated circuit containing processing cores for performing authentication and cryptography operations.

FIG. 2 is a diagrammatic representation of one example of a cryptography accelerator 201. The cryptography accelerator 201 includes an interface 203 connected to a host such as an external processor. According to various embodiments, the interface 203 receives information from the host for processing and sends information to the host when processing is completed. In one example, encrypted data associated with an SSL exchange is received through the interface. The interface 203 includes a scheduler for determining whether to send data blocks to various processing engines such as authentication engine 217 and cryptography engine 209. In one embodiment, encryption engine 209 includes components such as an RC4 engine 221 and an AES engine 223. An authentication engine 217 includes components such as MD5 engine 225 and SHA1 engine 227. It should be noted that a cryptography accelerator 201 can include other components as well, such as a public key engine or key generation cores for performing other authentication and encryption algorithms.

According to various embodiments, components for performing operations such as XOR operations are also included in the cryptography accelerator. In one example, an XOR component is included in the authentication engine so that SHA-1 and MD5 processed data can be combined together.

Protocols such as SSLv2 specify performing authentication operations to derive an authentication code corresponding to a data sequence. The authentication code and the data sequence are then both encrypted. In typical implementations, performing operations for SSLv2 involves reading a data sequence to calculate an authentication code. Various hash operations may be performed while reading a data sequence to determine the authentication code. The authentication code is then associated with the data sequence. In one embodiment, the authentication code is placed in a segment preceding the data sequence. The data sequence is then read again along with the authentication code. As the data sequence is read again, the data sequence is encrypted using block ciphers, stream ciphers or variations or stream ciphers.

According to various embodiments, the techniques of the present invention are used in a secured session, although it is contemplated that the techniques of the present invention can be used in any situation where both a data sequence and an authentication code are encrypted. Any message exchange sequence between two parties using both authentication and encryption and common session information known to both parties is referred to herein as a secured session. In one example, a secured session is an SSL session. A secured session typically includes a handshake phase and a data exchange phase. A handshake phase often includes a key exchange sequence establishing common information, such as a shared key, for the transmission of data during the data exchange phase between two parties. Any mechanism involving exchanging information to establish a secured session between two entities is referred to herein as a handshake phase. According to various embodiments, the techniques of the present invention apply to the handshake phase.

Figure 3:
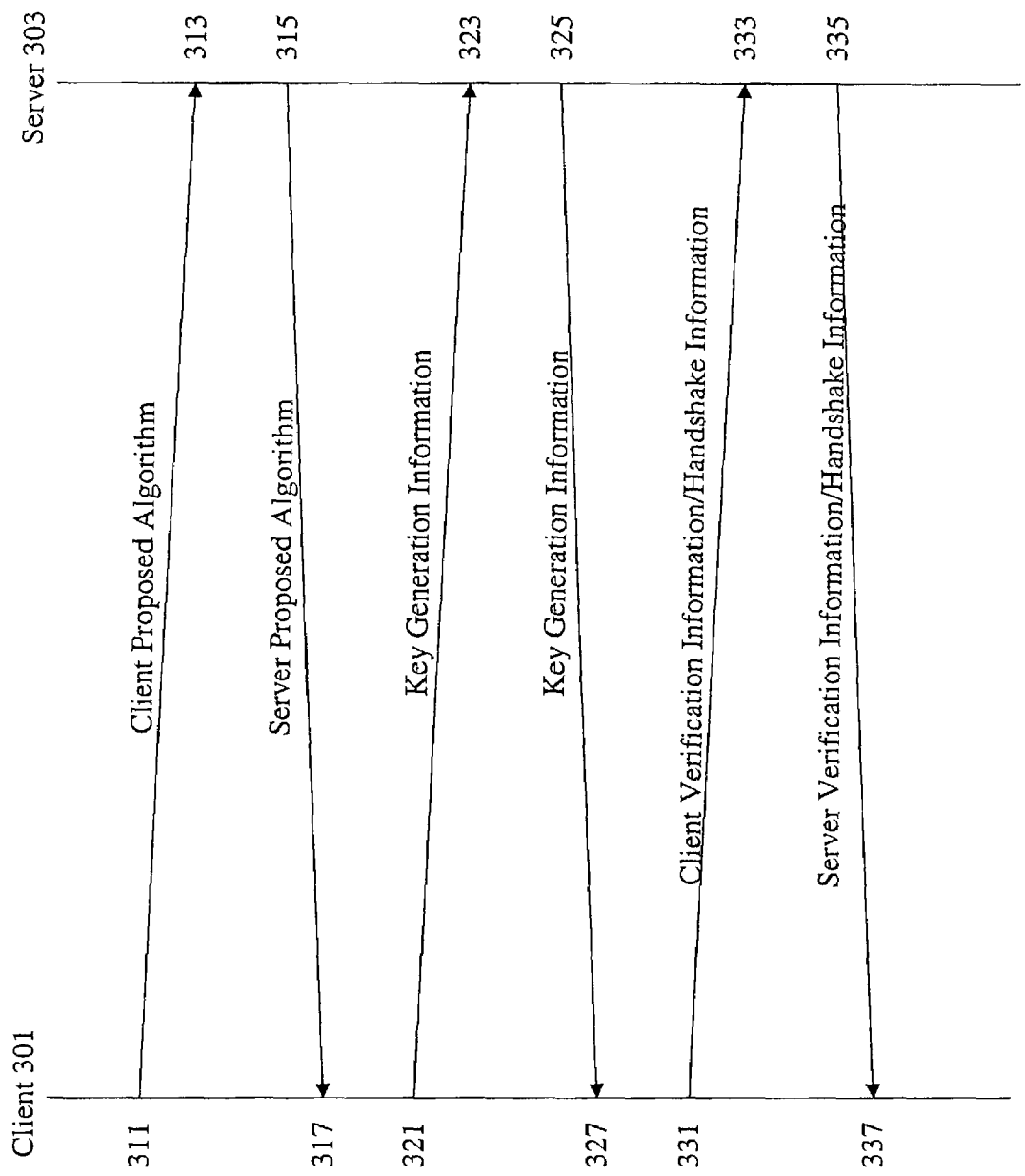
FIG. 3 is an interaction diagram showing a sequence in which the techniques of the present invention can be applied.

FIG. 3 is a transaction diagram showing one example of a handshake phase associated with SSL. A wide variety of sequences associated with handshake phases are available. At 311, the client 301 transmits a message with a security enable parameter to a server 303. In one embodiment, the authentication message contains an identifier such as a user name or an authentication identifier that allows the receiver to select an authentication mechanism out of a possible set of mechanisms. In another embodiment, the client sends an SSL version number, cipher settings, and client random information to the server 303. Server 303 may or may not already have information associated with the client. The server 303 identifies the security enable parameter along with any client proposed algorithms and proposes algorithms for encryption, for authentication, and for exchange or agreement of the cryptographic keys.

According to various embodiments, the server sends the server's own SSL version number, cipher settings, and server random information to the client 301. In one embodiment, the server also sends its certificate. A certificate may be a hash of a combined public key and identifier associated with the server encrypted with a trusted third party key. If the client is requesting a server resource that requires client authentication, the server at this point can also request that the client provide a certificate along with a digital signature. According to other embodiments, protocol version, session ID, cipher suite, and compression method are exchanged along with client random information and server random information.

At 317, client 301 uses the information sent by the server to authenticate the server. The client then generates a pre-master secret for the session, encrypts the pre-master secret with the server's public key obtained from the server certificate, and sends the encrypted pre-master secret to the server at 321. In one embodiment, the client computes a pre-master secret using cryptographic hardware to generate a random number. Information such as a pre-master secret or a client random sequence used to derive session keys is referred to herein as key generation information. In one example, a pre-master secret is used by both the server and the client to derive a master secret which is then used subsequently to derive session keys. Any intermediate information used to derive session keys from key generation information is referred to herein as master secret information.

According to various embodiments, master secret information is not transmitted over the network during a handshake phase but is instead derived independently by both a client entity and a server entity. If the server requested client authentication, the client signs a piece of data that is unique to this handshake and known by both the client and server and sends both the signed information and the client's own certificate to the server. According to various embodiments, the client signs a piece of data unique to the handshake by performing a hash.

According to various embodiments, the server 303 at 325 attempts to authenticate the client if client authentication was requested. If the client can not be authenticated, the session is terminated. If the client can be authenticated, the server 303 uses the key generation information from the client to generate session keys. In one example, the server 303 uses its private key to decrypt the pre-master secret. Both the server 303 and the client 301 use key generation information such as the pre-master secret to generate a master secret and subsequently to generate the session keys. In typical implementations, a function call is issued to a cryptography accelerator to derive a master secret from a pre-master secret. According to various embodiments, the function call parameters include protocol information and key generation information such as the pre-master secret, client random number, and server random number exchanged during the handshake.

The cryptography accelerator sends back a master secret. According to various embodiments, the cryptography accelerator sends the master secret back to a CPU running SSL software. The techniques of the present invention recognize that the master secret is not information that the CPU needs at this point. Instead of consuming valuable system resources such as bus, memory, and interface resources, the techniques of the present invention contemplate not sending the master secret back to the CPU. In typical implementations, the CPU stores the master secret and then performs context processing in order to provide protocol information to a cryptography accelerator to determine session keys. The CPU then sends the master secret along with processed protocol information to the cryptography accelerator.

At 327, the session keys generated at both the client and the server are used to establish the secure session. According to various embodiments, cryptography accelerators associated with both client 301 and server 303 derive keys based on the selected algorithm or algorithms. According to various embodiments, the session keys can be used for communications between client 301 and server 303. It should be noted that a variety of different authentication sequences and communication sequences in general can use the techniques of the present invention. For example, only a single session key may be generated in some instances.

At 331, client 301 sends handshake information to the server 303. Any information transmitted for determining that the session keys generated at the server and the session keys generated at the client are the same set of keys is referred to herein as handshake information or verification information. In one example, a server 303 receives from the client 301 handshake information including a hash of the session keys combined with other key generation information. The server 303 then calculates client verification information using the session keys it generated. If the handshake information corresponds with the client verification information generated at the server, verification is completed. Information generated by the server for comparison with handshake information sent from the client to determine that the client has the correct set of session keys is referred to herein as handshake information, client verification information, or client finished information.

In another example, the server issues a function call to a cryptography accelerator that hashes the combination of a verification message received from the client, protocol information, and a master secret to generate client verification information. The cryptography accelerator then sends the client verification information back to the server CPU. At 333, the server typically decrypts any message associated with client verification information received from the client entity 301 and compares the decrypted message with the generated client verification information to determine that the client verification information matches. The server then typically issues a function call to a cryptography accelerator to generate a server verification message.

Information generated by a server and sent to a client to determine that the server has the correct set of session keys is referred to herein as handshake information, server verification information or server finished information. In one example, the server CPU sends handshake information received from the client and client verification information to a cryptography accelerator that computes the server verification information. It should be noted that padding as well as other context information may be included in a variety of function calls and computations even if it is not explicitly stated.

It should be noted that in the above implementation, a master secret is never transmitted over the network. Instead, both network entities use derivatives of the pre-master secret to generate the session keys and other cryptographic information used for secure transmission. Both the master secret and the session keys need not ever be transmitted over the network.

It is contemplated that a cryptography accelerator can be used in any network entity including client and server entities. It should be noted that the authentication sequence shown in FIG. 3 is only one example of a sequence that can use the mechanisms and techniques of the present invention. In one example, both server and client can access key generation information from a third party source in order to derive information for a data exchange. In another example, client random numbers may be included in a client proposed algorithm message instead of a key generation information message.

Figure 4:
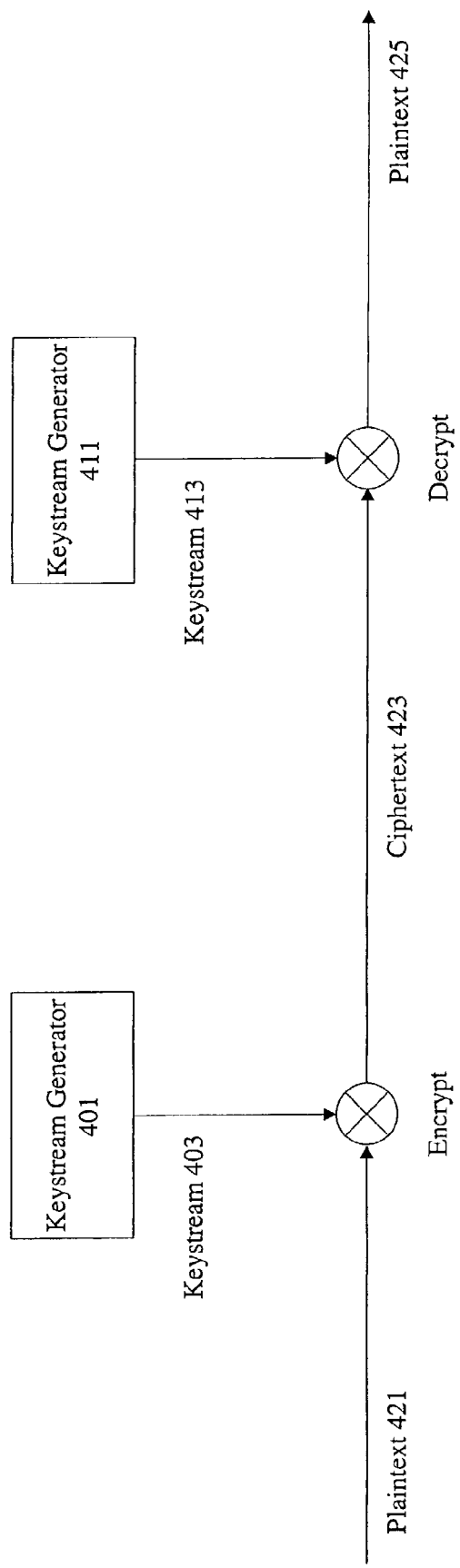
FIG. 4 is a diagrammatic representation showing authentication and encryption using a stream cipher.

FIG. 3 describes a portion of a secured session applying encryption and authentication in which the techniques of the present invention can be used. FIG. 4 is a diagrammatic representation showing a stream cipher, which is one specific technique for encrypting and decrypting data. According to various embodiments, the techniques of the present invention apply to encryption using stream ciphers and stream cipher variations. Stream ciphers convert plaintext to ciphertext one bit at a time. In one example, plaintext is converted to ciphertext several bits or several bytes at a time. A keystream generator 401 outputs a stream of bits 403 also referred to as the keystream 403.

The keystream 403 is XORed with plaintext 421 to produce a stream of ciphertext bits 423. At the decryption end, the ciphertext bits 423 are XORed with a keystream 413 produced by a keystream generator 411 to produce plaintext 425. In typical implementations, the keystream 403 is substantially identical to keystream 413. The keystreams 403 and 413 are usually output by the key generators 401 and 411 as a function of a shared key between keystream generator 401 and keystream generator 411. The shared key may be derived as shown in FIG. 3. According to various embodiments, the shared key is supplied to substantially identical keystream generators 401 and 411 to output substantially identical keystreams 403 and 413.

Various protocols entail encrypting data sequences using stream ciphers. In several implementations, an authentication code is calculated for a particular data sequence and associated with the data sequence. In one embodiment, the authentication code calculated for a data sequence is attached to the head of the data sequence. The portion of a data sequence read first in a cryptography accelerator is referred to herein as the head of the data sequence. The authentication code and the data sequence are input as plaintext 421 and XORed with a keystream 403. The encrypted authentication code and the encrypted data are passed as ciphertext 423. When the encrypted authentication code and the encrypted data are XORed with keystream 413, plaintext 425 including the authentication code and the data sequences are derived.

It should be noted that in the above example, a data sequence is read twice. That is, several passes of the data sequence must be made in order to provide an encrypted authentication code and encrypted data sequence. In the first pass, the data sequence is accessed in order to calculate an authentication code. In the second pass, the data sequence is read and XORed with a keystream 403 to provide ciphertext 423 including the encrypted authentication code and the encrypted data sequence. Techniques are provided for outputting an encrypted authentication code and an encrypted data sequence upon accessing a data sequence once. Reading or writing or performing some other operation on a data sequence is referred to herein as accessing a data sequence. Providing an encrypted authentication code and an encrypted data sequence while accessing the data once is referred to herein as single pass encryption and authentication.

Figure 5:
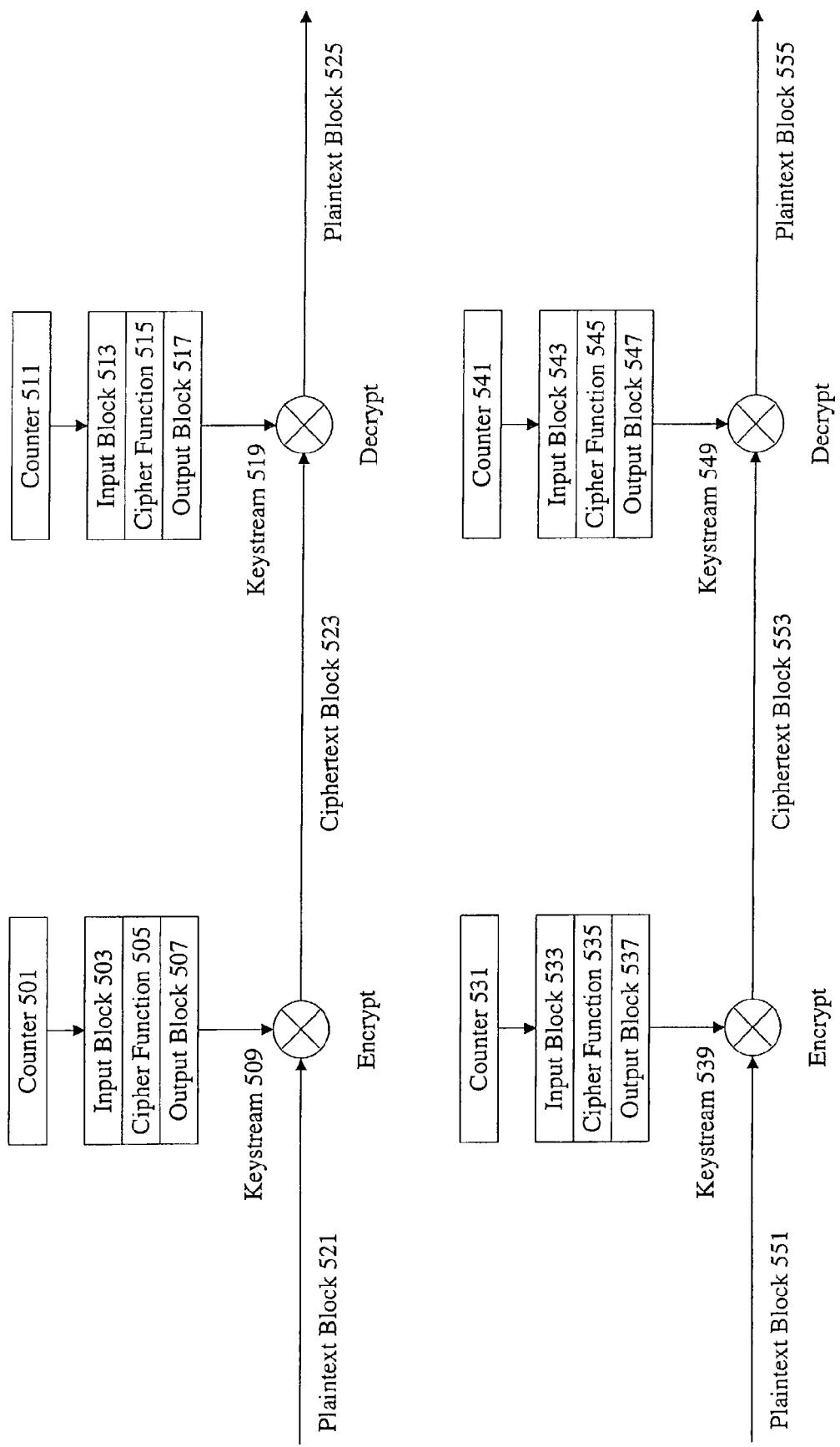
FIG. 5 is a diagrammatic representation showing authentication and encryption using a block cipher in counter mode.

Although the techniques of the present invention provide an encrypted authentication code and an encrypted data sequence in a single pass for stream ciphers, the techniques of the present invention also apply to variations to stream ciphers. According to various embodiments, the techniques of the present invention apply to encryption and the encryption algorithms where both in authentication code and a data sequence are encrypted. FIG. 5 is a diagrammatic representation showing one example of encryption and decryption using a stream cipher variation. Block ciphers in counter mode use sequence numbers in counters 501 and 531 as inputs to an algorithm. After input block 503 is encrypted using cipher function 505 to produce output block 507, counter 501 is varied to encrypt a next block. In one example, counter 531 includes the value of counter 501 incremented by one.

The output blocks 507 and 537 are provided as keystreams 509 and 539 and combined with plaintext blocks 521 and 551 typically through XOR functions. According to various embodiments, plaintext blocks 521 and 551 include the authentication code and the data sequence corresponding to the authentication code. The outputs of the XOR functions are ciphertext blocks 523 and 553, including the encrypted authentication code and the encrypted data sequence. It should be noted, that ciphertext blocks 523 may include the encrypted authentication code and part of the encrypted data sequence and the ciphertext blocks 553 may include the rest of the encrypted data sequence. It should be noted also that the number of blocks of ciphertext and the number of blocks of plaintext can vary widely.

To apply decryption, a counter 511 is varied after an input blocks 513 is processed using cipher functions 515 to provide output blocks 517. The output block 517 is provided as keystream 519 to decrypt ciphertext blocks 523 through a combination function such as an XOR function. Counter 541, representing the varied value in counter 511, is provided to cipher function 545 and applied to input block 543 to produce output block 547. The output block 547 is used as keystream 549 to decrypt ciphertext block 553. Plaintext blocks 525 and 555 include the authentication code and the data sequence corresponding to plaintext blocks 521 and 551.

Figure 6:
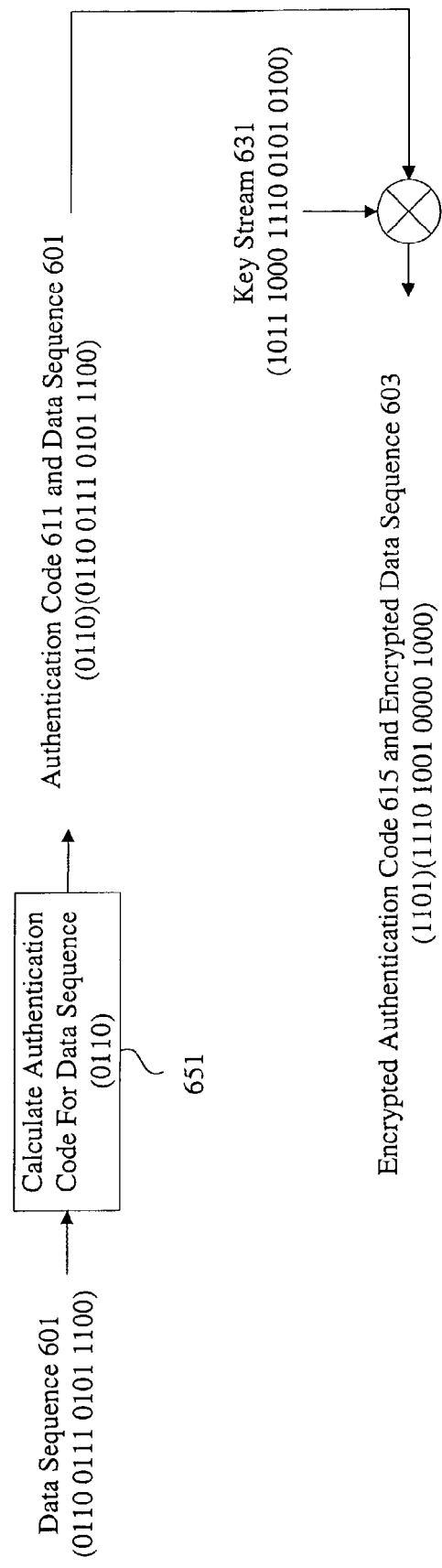
FIG. 6 is a diagrammatic representation showing authentication and encryption using a stream cipher.

FIG. 6 is a diagrammatic representation showing one example of authentication and encryption and a data sequence. In typical implementations, a data sequence 601 (0110 0111 0101 1100) is passed to a cryptography accelerator including authentication circuitry and keystream generation circuitry. In one example, and authentication code for the data sequence 601 is calculated at 651 using a hash functions such as MD5 or SHA1. Calculating the authentication code typically requires a single pass of the data sequence through the cryptography accelerator. After this access of the data, the authentication code 611 (0110) is appended to the data sequence 601 (0110 0111 0101 1100) and provided to encryption circuitry. In typical implementations, the authentication 611 (0110) is appended to the head of the data sequence 601 (0110 0111 0101 1100). A second pass of the data sequence 601 (0110 0111 0101 1100) through the cryptography accelerator is used to combine the authentication code 611 (0110) and the data sequence 601 (0110 0111 0101 1100) with the keystream 631 (1011 1000 1110 0101 0100). In one example, the XOR function provides in encrypted authentication code 615 (1101) and an encrypted data sequence 603 (1101)(1110 1001 0000 1000). It should be noted that techniques for decryption can proceed in the same manner as noted above.

Figure 7:
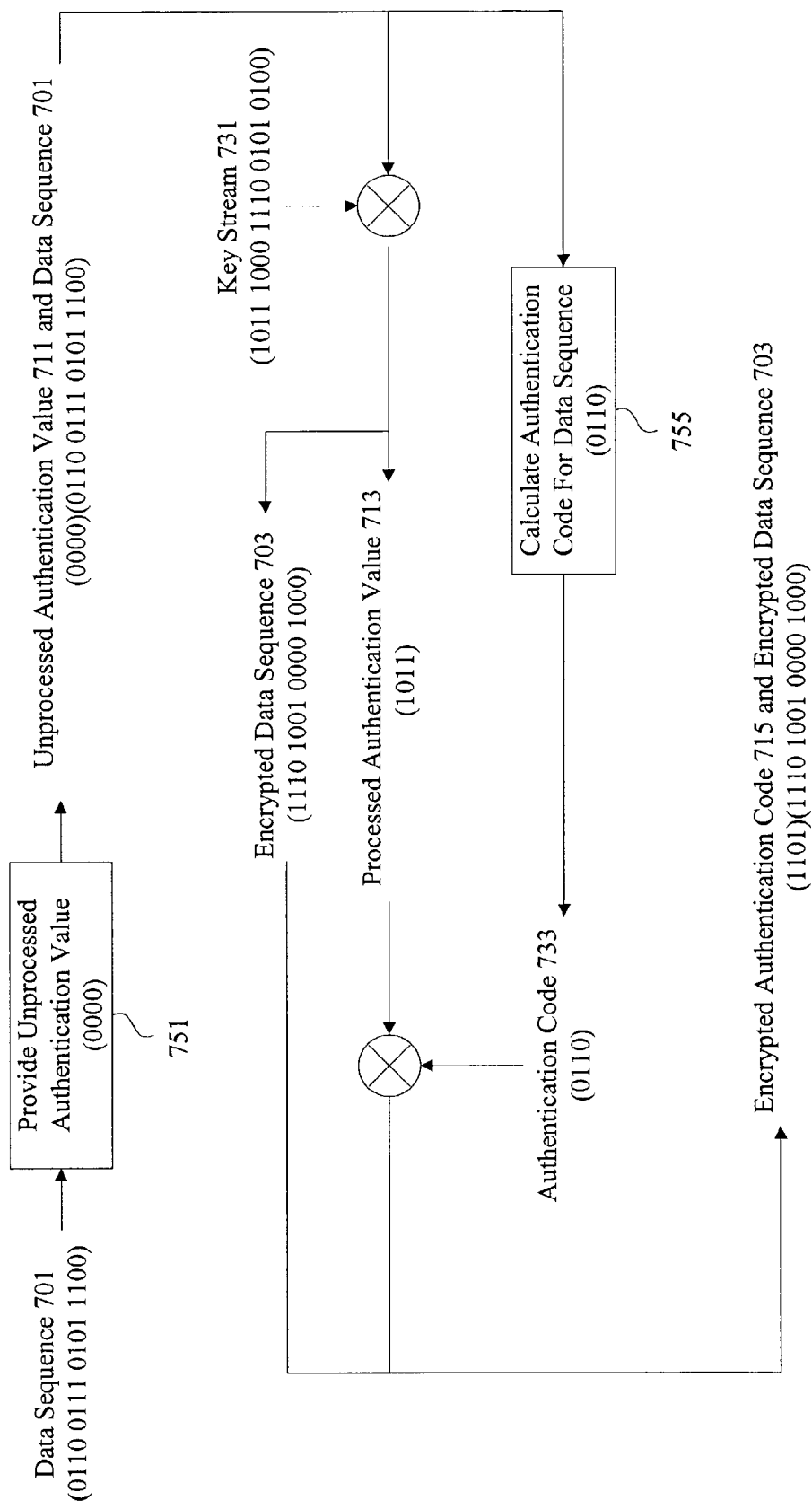
FIG. 7 is a diagrammatic representation showing authentication and encryption using a stream cipher in a single pass.

FIG. 7 is a diagrammatic representation showing one example of authentication and encryption of a data sequence in a single pass. A data sequence 701 (0110 0111 0101 1100) is associated with an unprocessed authentication value at 751. According to various embodiments, the unprocessed authentication value 711 (0000) is a string of zeros equal in length to an authentication code to be calculated for the data sequence 701. Is should be noted that a variety of sequences such as sequences of zeros or ones or any pattern of bits can be used. The unprocessed authentication value 711 (0000) and the data sequence 701 (0110 0111 0101 1100) is provided for combination with a keystream 731 (1011 1000 1110 0101 0100). As the data sequence 701 (0110 0111 0101 1100) is being read for combination with keystream 731 (1011 1000 1110 0101 0100), the authentication code for the data sequence is calculated at 755.

In this manner, the data sequence 701 (0110 0111 0101 1100) needs to be accessed only once for both the encryption of the data sequence and the calculation of the authentication code. However, it should be noted that an encrypted authentication code is required by some cryptography protocols. To provide an encrypted authentication code, the authentication code 733 (0110) is combined with the processed authentication value 713 (1011). In this example, the processed authentication value 713 (1011) corresponds to the first four bits of the keystream 731 (1011 1000 1110 0101 0100) because the unprocessed authentication value 711 is (0000). In this particular example, the first four bits of the keystream 731 (1011 1000 1110 0101 0100) combined with the authentication code 733 (0110) yields the encrypted authentication code 715 (1101).

It should be noted that stream ciphers typically combine bits of a keystream with bits of a data sequence from left to right. That is, the first bits combined with the keystream may be the bits where the authentication code should be. To prevent the redundancy of reading the data sequence first, calculating the authentication code, and then accessing the data sequence again for combination with a keystream, an unprocessed authentication value is provided as a placeholder for combination with the keystream. Any value used as a placeholder for combination of a data sequence with a keystream while an authentication code is being calculated is referred to herein as an unprocessed authentication value. After the unprocessed authentication value 711 is combined with bits in the keystream, a processed authentication value 713 is provided. According to various embodiments, the processed authentication value 713 is substantially identical to the portion of the keystream that would have been combined with an authentication code.

The portion of the keystream that would have been combined with an authentication code, i.e. (1011), is referred to herein as an authentication code portion of the keystream. The portion of the keystream that would have been combined with the data sequence, i.e. (1000 1110 0101 0100), is referred to herein as a data sequence portion of the keystream. Any value that corresponds to an unprocessed authentication value combined with the portion of the keystream that would have been combined with an authentication code is referred to herein as a processed authentication value. The processed authentication value 713 (1011) is combined with the authentication code 733 (0110) calculated while the processed authentication value 713 (1011) was being calculated.

The encrypted authentication code 715 (1101) and the encrypted data sequence 703 (1110 1001 0000 1000) are provided as output. It should be noted that the encrypted authentication code 715 (1101) and the encrypted data sequence 703 (1110 1001 0000 1000) calculated using a single pass technique described in FIG. 7 are the same as the outputted encrypted authentication code 615 (1101) and the outputted encrypted data sequence 603 (1110 1001 0000 1000) calculated using the multiple pass technique shown in FIG. 6.

In other examples, an unprocessed authentication value can be a sequence of ones and various sequences such as the keystream and the authentication code may be combined using functions such NAND and OR functions.

Figure 8:
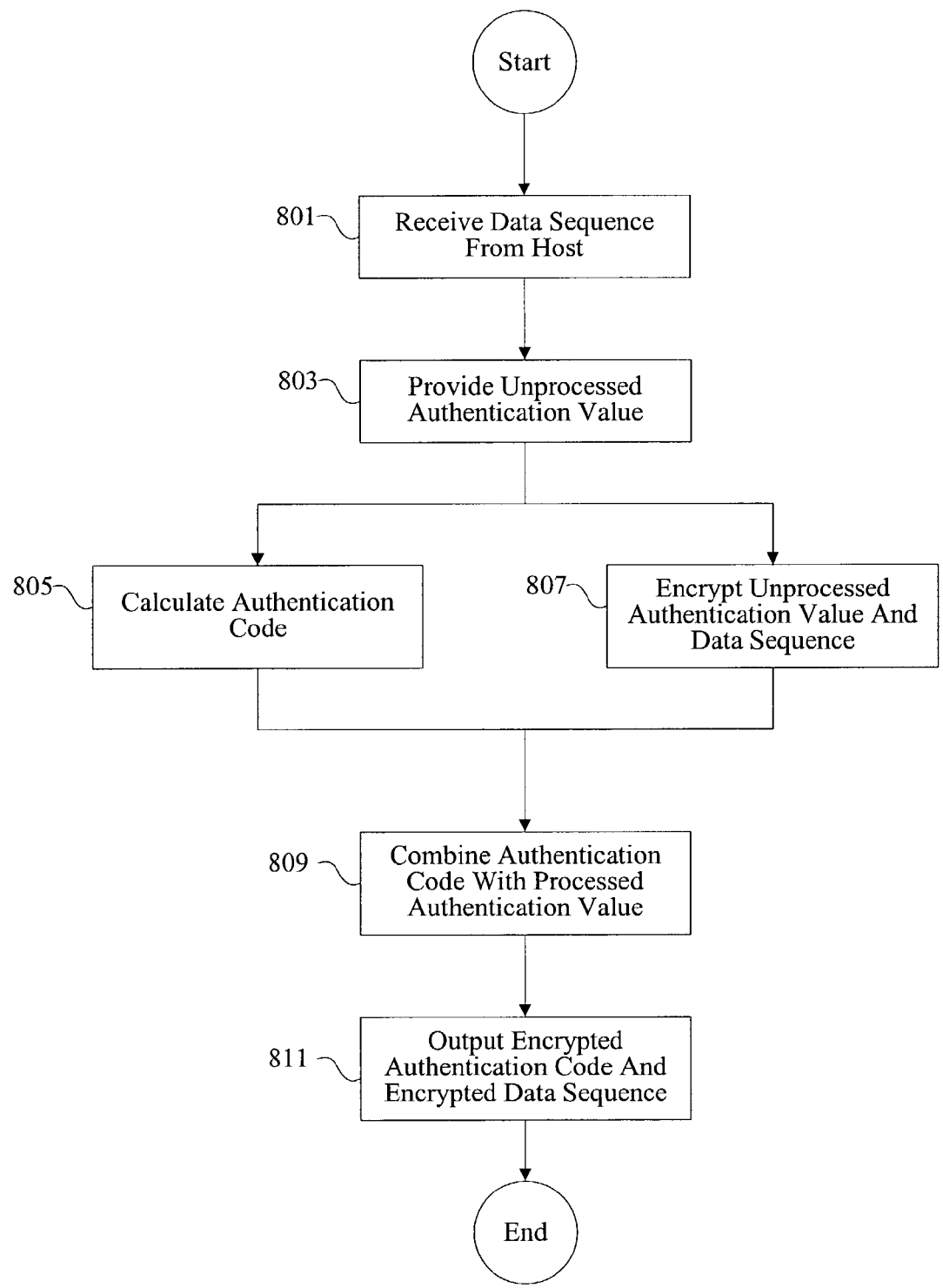
FIG. 8 is a flow process diagram showing techniques for authentication and encryption using a stream cipher in a single pass.

FIG. 8 is a flow process diagram showing techniques for encrypting and authenticating in a single pass. At 801, the data sequence is received from a host. According to various embodiments, the host is a CPU. An unprocessed authentication value is provided at 803. In one example, the unprocessed authentication value is a sequence of zeroes, although it should be noted that the unprocessed authentication value can be any predetermined sequence. At 805, an authentication code is calculated while the unprocessed authentication value and data sequence are encrypted at 807. It should be noted that calculating the authentication code at 805 and encrypting the unprocessed authentication value and data sequence at 807 can be done with a single access to the data sequence. Encrypting the unprocessed authentication value and the data sequence at 807 may entail using a stream cipher or a variation of the stream cipher while calculating the authentication code at 805 may entail performing hash operations on the data sequence.

At 809, the authentication code calculated at 805 is combined with the encrypted unprocessed authentication value, i.e. the processed authentication value, to derive the encrypted authentication code. At 811, the encrypted authentication code and the encrypted data sequence are provided as output. In one example, the encrypted authentication code and the encrypted data sequence are provided as output to a host. In other examples, the encrypted authentication code and the encrypted data sequence are provided directly to network devices. Providing data directly to network devices and other components in a computer system is described in concurrently filed U.S. patent application Ser. No. 10/161, 475 titled Improving Data Transfer Efficiency In A Cryptography Accelerator System by Joseph Tardo and Mark Buer, the entirety of which is incorporated by reference for all purposes.

Although the techniques of the present invention have been described in the context of a secured session such as SSLv2, the cryptography accelerator of the present invention also provides single pass encryption and authentication functionality for a variety of different cryptographic operations.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method of performing cryptography operations, the method comprising:
   receiving a data sequence at a cryptography accelerator;
   encrypting the received data sequence and an unprocessed authentication value to generate an encrypted data sequence and a processed authentication value simultaneously with computing an authentication code for the received data sequence;
   combining the authentication code with the processed authentication value to generate an encrypted authentication code, wherein the encrypted authentication code and the encrypted data sequence are derived upon performing a single access to the data sequence; and
   providing the encrypted authentication code and the encrypted data sequence.

2. The method of claim 1, wherein the encrypted data sequence is derived by combining a first portion of a keystream corresponding to the data sequence with the data sequence.

3. The method of claim 1, wherein the encrypted data sequence is derived by combining a first portion of a keystream corresponding to the data sequence with the data sequence using XOR operations.

4. The method of claim 1, wherein the encrypted authentication code is derived by combining the processed authentication value with the authentication code using XOR operations.

5. The method of claim 1, wherein the authentication code is calculated by performing hash operations on the data sequence.

6. A cryptography accelerator, comprising:
   an interface configured to receive a data sequence;
   a keystream generator operable to provide a keystream associated with the data sequence; and
   cryptography circuitry configured to encrypt the received data sequence and an unprocessed authentication value to generate an encrypted data sequence and a processed authentication value and simultaneously compute an authentication code for the received data sequence, and to combine the authentication code with the processed authentication value to generate an encrypted authentication code;
   wherein the encrypted authentication code and the encrypted data sequence are derived upon performing a single pass read of the data sequence.

7. The cryptography accelerator of claim 6, wherein the encrypted data sequence is derived by combining a first portion of the keystream corresponding to the data sequence with the data sequence.

8. The cryptography accelerator of claim 6, wherein the encrypted data sequence is derived by combining a first portion of the keystream corresponding to the data sequence with the data sequence using XOR operations.

9. The cryptography accelerator of claim 8, wherein the encrypted authentication code is derived by combining the processed authentication value with the authentication code using XOR operations.

10. The cryptography accelerator of claim 6, wherein the authentication code is calculated by performing hash operations on the data sequence.

11. A method for authenticating and encrypting a data sequence, the method comprising:
    receiving a data sequence at a cryptography accelerator from a host;
    providing an unprocessed authentication value associated with the data sequence;
    combining the data sequence and the unprocessed authentication value with a keystream, wherein combining the unprocessed authentication value and the data sequence with the keystream provides a processed authentication value and an encrypted data sequence;
    calculating an authentication code associated with the received data sequence, wherein the combining of the unprocessed authentication value and the received data sequence with the keystream is performed simultaneously with the calculating of the authentication code;
    combining the processed authentication value with the calculated authentication code to derive the encrypted authentication code; and
    providing the encrypted authentication code and the encrypted data sequence.

12. The method of claim 11, wherein combining data sequence and the unprocessed authentication value with a keystream comprises performing an XOR operation.

13. The method of claim 11, wherein combining the processed authentication value with the calculated authentication code comprises performing an XOR operation.

14. The method of claim 11, wherein the unprocessed authentication value is a sequence of zeroes.

15. The method of claim 11, wherein the processed authentication value is identical to a portion of the keystream.

16. The method of claim 11, wherein the encrypted authentication code and the encrypted data sequence are provided to the host.

17. The method of claim 16, wherein the host is a CPU.

18. The method of claim 11, wherein the encrypted authentication code and the encrypted data sequence are provided to a network device, wherein calculating the authentication code comprises performing hash operations on the data sequence.

19. An apparatus for authenticating and encrypting a data sequence, the apparatus comprising:
    means for receiving a data sequence at a cryptography accelerator from a host;
    means for providing an unprocessed authentication value associated with the data sequence;
    means for combining the data sequence and the unprocessed authentication value with a keystream while calculating an authentication code associated with the data sequence, wherein combining the unprocessed authentication value and the data sequence with the keystream provides a processed authentication value and an encrypted data sequence;

means for calculating an authentication code associated with the received data sequence, wherein the combining of the unprocessed authentication value and the received data sequence with the keystream is performed simultaneously with the calculating of the authentication code;

means for combining the processed authentication value with the calculated authentication code to derive the encrypted authentication code; and means for providing the encrypted authentication code and the encrypted data sequence.

20. The apparatus of claim 19, wherein combining the data sequence and the unprocessed authentication value with a keystream comprises performing an XOR operation.

21. The apparatus of claim 19, wherein combining the processed authentication value with the calculated authentication code comprises performing an XOR operation.

22. The apparatus of claim 19, wherein the unprocessed authentication value is a sequence of zeroes.

23. The apparatus of claim 19, wherein the processed authentication value is identical to a portion of the keystream.

24. The apparatus of claim 19, wherein the encrypted authentication code and the encrypted data sequence are provided to the host.

25. The apparatus of claim 24, wherein the host is a CPU.

26. The apparatus of claim 19, wherein the encrypted authentication code and the encrypted data sequence are provided to a network device, wherein calculating the authentication code comprises performing hash operations on the data sequence.

* * * * *